Figure 1:
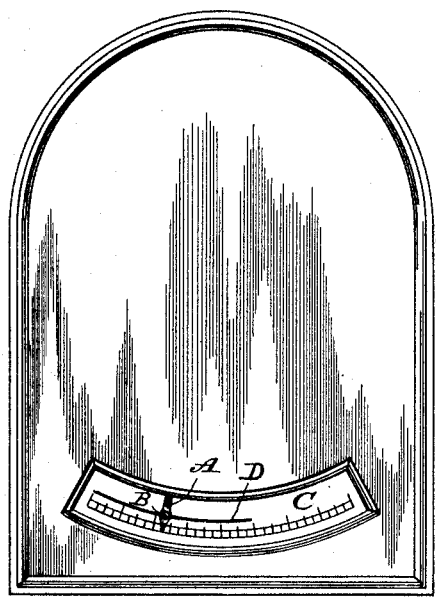

No. 616,669. Patented Dec. 27, 1898.
A. H. HOYT.
RECORDING DEVICE FOR MEASURING INSTRUMENTS.
(Application filed Aug. 13, 1897.)

(No Model.)

Witnesses
H. W. Eastman
Moses Wadleigh

Inventor
Adrian H. Hoyt
By his Attorney J. B. Thurston

UNITED STATES PATENT OFFICE.

ADRIAN H. HOYT, OF PENACOOK, NEW HAMPSHIRE.

RECORDING DEVICE FOR MEASURING INSTRUMENTS.

SPECIFICATION forming part of Letters Patent No. 616,669, dated December 27, 1898.

Application filed August 13, 1897. Serial No. 648,108. (No model.)

*To all whom it may concern:*

Be it known that I, ADRIAN H. HOYT, a citizen of the United States, residing at Penacook, in the county of Merrimac and State of New Hampshire, have invented certain new and useful Improvements in Recording Devices for Measuring Instruments; and I do hereby declare the following to be a full, clear, and exact description of the invention, such as will enable others skilled in the art to which it appertains to make and use the same.

My present invention contemplates the use in an electric meter of a graduated scale or dial and a hand or pointer which will record thereon the maximum current or load upon a circuit within a given time or between two observations.

In my recent application for patent for a maximum meter I employed a dial and a non-returning hand or pointer—*i. e.*, the hand in that case was held at any point on the scale where it might be forced by the current passing through the instrument; but with my present improvement the hand or pointer will readily fluctuate forward or backward on the scale as the strength of current on the circuit may either increase or decrease, always recording the maximum load, even though it may be found at a certain reading at a point near zero. This I accomplish by means of a stylus or pencil attached to the hand or pointer, which will give ocular evidence as to the distance the hand or pointer has been up the scale regardless of where it may be on said dial or scale at a given reading.

My present improvements are applicable to an instrument employing a graduated scale or dial and a movable hand thereon.

The invention will be fully set forth in the following specification and claim and clearly illustrated in the drawings accompanying and forming a part of the same, of which—

Figure 2:
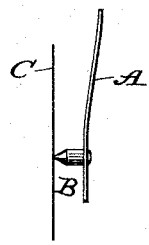
Figure 3:
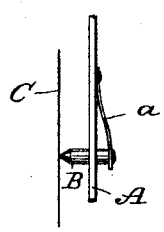

Figure 1 is an elevation of a maximum meter having a graduated scale and one of my improved marking hands or pointers. Fig. 2 is a portion of one of my improved marking-hands on an enlarged scale and having its stylus or pencil in contact with a line representing a dial. Fig. 3 is a similar view showing a modification of my invention.

The hand or pointer A may be formed of suitable spring metal and be provided near its end with a point or stylus B, adapted to bear upon the dial C, in which case to insure the best results said dial should be covered with a piece of transfer or carbon paper, so that a distinct line or mark may be left or recorded on said dial, which dial may be removed and replaced by a new one after each reading, or a pencil may be substituted for the stylus, which will mark the dial as the hand or pointer is moved across the same by the variation of current on the circuit.

In the modification Fig. 3 the hand A is made of thicker non-yielding material, and the stylus or pencil B is movable longitudinally in its end, a suitable spring *a* being secured to said hand in a manner to bear against the end of the stylus, and thus insure a constant and steady contact of the latter with the dial, the important feature of the invention being to cause the hand of such an instrument to record the exact distance it has gone up the scale between two observations.

D represents a line made upon the dial or scale by the stylus, the position of the pointer showing the latter to have returned some points down the scale toward zero.

Having described my invention, what I claim is—

In an electrical measuring instrument, a stylus moving over a renewable scale, back and forth in the same path, and tracing by such movement a line which by its length indicates the maximum reading of the instrument during a given time.

In testimony whereof I affix my signature in presence of two witnesses.

ADRIAN H. HOYT.

Witnesses:
J. ALBERT MASSIE,
H. W. YOUNG.